(12) United States Patent
Kaplan

(10) Patent No.: US 6,378,814 B1
(45) Date of Patent: Apr. 30, 2002

(54) COMMUNICATION CABLE CLIP

(75) Inventor: Steve E Kaplan, Elyria, OH (US)

(73) Assignee: Multilink, Inc., Elyria, OH (US)

( * ) Notice: Subject to any disclaimer, the term of this patent is extended or adjusted under 35 U.S.C. 154(b) by 0 days.

(21) Appl. No.: 09/658,744

(22) Filed: Sep. 11, 2000

(51) Int. Cl.$^7$ ................................................. F16B 15/00
(52) U.S. Cl. ........................................ 248/71; 248/74.3
(58) Field of Search ........................ 248/68.1, 71, 74.3, 248/535, 207, 230.9, 505, 60

(56) References Cited

U.S. PATENT DOCUMENTS

| | | | | |
|---|---|---|---|---|
| 3,149,808 A | * | 9/1964 | Weckesser | |
| 3,632,070 A | * | 1/1972 | Thayer | 248/74.3 |
| 3,966,154 A | * | 6/1976 | Perrault et al. | |
| 4,779,828 A | * | 10/1988 | Munch | |
| 4,811,475 A | * | 3/1989 | Morton, Jr. | |
| 4,925,136 A | * | 5/1990 | Knott | |
| 5,326,055 A | * | 7/1994 | Page et al. | 248/74.3 |
| 5,337,983 A | * | 8/1994 | Mailey | |
| 5,358,162 A | * | 10/1994 | Hill | |
| 6,170,784 B1 | * | 1/2001 | MacDonald et al. | 248/74.3 X |
| 6,196,751 B1 | * | 3/2001 | Khokar | |

* cited by examiner

*Primary Examiner*—Anita King
*Assistant Examiner*—Korie Chan
(74) *Attorney, Agent, or Firm*—Renner, Otto, Boisselle & Sklar, LLP

(57) ABSTRACT

Communication cable clip has an anchor portion for insertion between clapboards and a bottom portion which protrudes outwardly to provide structure having openings for ties for horizontal and vertical runs of cable.

6 Claims, 1 Drawing Sheet

COMMUNICATION CABLE CLIP

The present invention relates to methods of, and a mounting device for, supporting communication cables, for example, telecommunication, or CATV, wire or fiber optic cables, in their runs along wall siding thereon, and particularly to a mounting device capable of simultaneously supporting runs of a wide range of cable sizes as well as accommodating the removal of a cable or the addition of a new cable, and of being used to secure cable which runs either vertically or horizontally along the wall.

Cables have been supported along walls having overlapping siding using a mounting "clip" which has an anchor portion that slides vertically under the bottom edge of the overlapping boards of the siding. Such mounting clips have utilized an anchor portion which slides vertically under the bottom edge of the siding boards. Cable have also been tied to structures by using commercially available plastic self locking ties, the cable being encircled by the tie which loops through a device for holding the cable. Commercial plastic ties are available with a plastic belt length with a self locking one way "buckle" on one end through which the other end may be threaded to pull the tie tightly around the cable and lock itself against releasing.

It is an object of the present invention to provide a siding clip for use in tying a communication cable to a wall with overlapping siding boards, the clip being such that it will accommodate the supporting of a wide range of cable sizes and multiple cables as well as being capable of supporting either horizontal or vertical runs, and accommodating the addition or removal of cables being supported by the clip.

SUMMARY OF INVENTION

The present invention provides a clip, preferably made of a rigid plastic, which comprises a strap, or tie, portion having multiple slots for receiving ties for supporting cable runs along the side of a building wall, the wall having clapboard siding, or other similarly overlapping siding. In accordance with the invention, a vertical clip, having a vertical rear back portion extending the vertical length of the clip, comprises a relatively thin top portion for wedging the clip under the overlap of a siding board or the like, and a bottom portion which extends over the overlapped siding below the bottom edge of the overlapping board. The bottom portion of the clip comprises a support portion for a tie portion having at least one tie opening for receiving a tie for tying a vertical cable run to the clip and at least a second opening for similarly tying a horizontal cable run. In the preferred embodiment the tie portion of the clip has slot openings and is displaced outwardly from the siding to provide ready access thereto when tying a cable to the clip. Preferably the openings through the tie support portion of the clip for the vertical and horizontal cable runs lie along lines perpendicular to each other, with the tie portion being in a plane parallel to the general plane of the wall, with the planes for the tie portion and the wall being displaced from each other to provide easy access to the openings for the ties. In the preferred embodiment, the tie support portion is preferably an integral part of the clip (including both the top and bottom portions) and is preferably of rectangular shape with opposed top and bottom edges and two opposed vertical sides generally perpendicular to the top and bottom sides, there being a tie opening for a horizontal run of cable along the bottom side and at a tie opening along at least one vertical side, and preferably along both vertical sides, for tying vertical cable runs.

The clip of the invention may be used to accommodate the use of a single tie opening to support two cables by using a single tie for each or using a single tie to encircle the both cables. Thus, a cable slot which already has a cable tied through it, may be used to tie another cable by severing the first tie, cutting it if necessary, and using a new tie of appropriate length to feed through the slot opening and encircle both of the cables to secure both to the clip.

DESCRIPTION OF DRAWINGS

The following is a description of the drawings of preferred embodiments of the present invention, forming a part of this specification for the material disclosed therein, and in which.

SPECIFICATION

Figure 1:
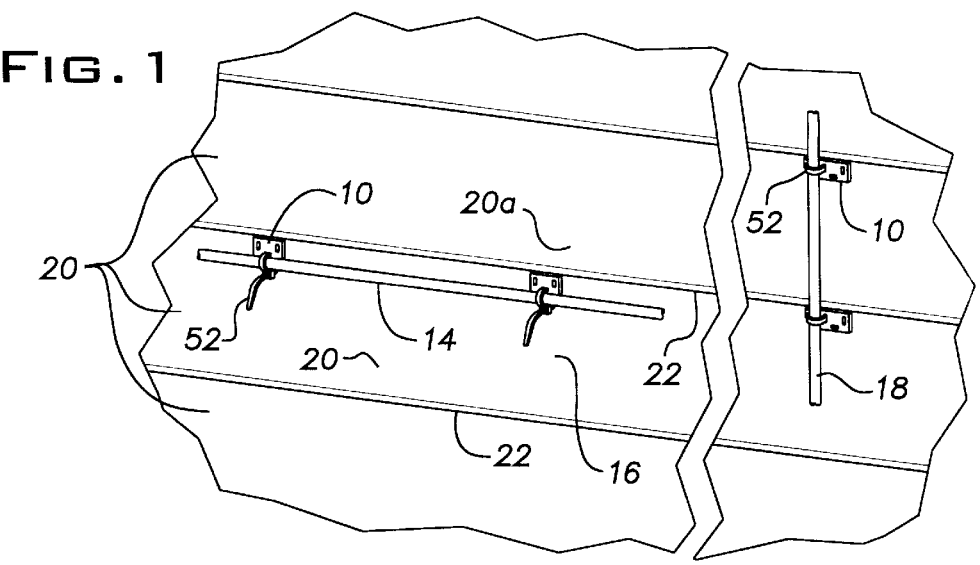
FIG. 1 is a view showing cable runs along a wall, each of which are supported by a clip of the present invention.

Referring to FIG. 1, cable clips 10, embodying a preferred embodiment of the present invention are shown with a clip 10 supporting a horizontal run of communication cable 14 along a wall 16 while a second clip 10 is shown as supporting a vertical run of communication cable 18. The wall 16 has overlapping horizontal clapboard siding with horizontal siding boards 20 each having a bottom portion 20a, which includes its bottom edge 22, overlapping the next lower board, all in a conventional manner.

Figure 2:
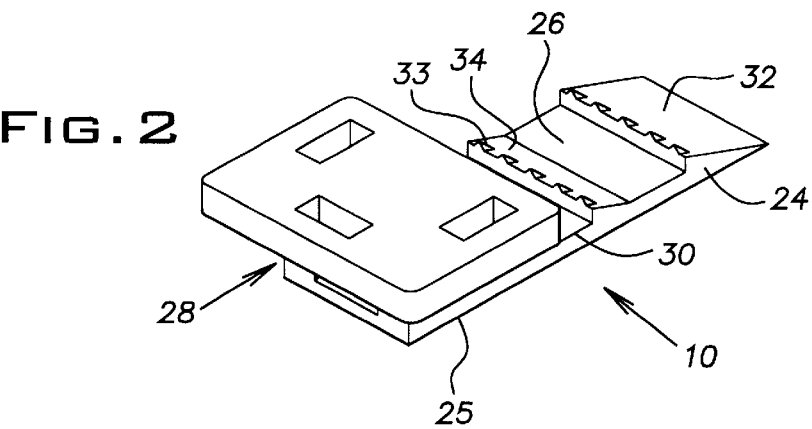
FIG. 2 is a front, bottom, right side view looking down on the front of the cable support clip as the clip are viewed in FIG. 1.
Figure 3:
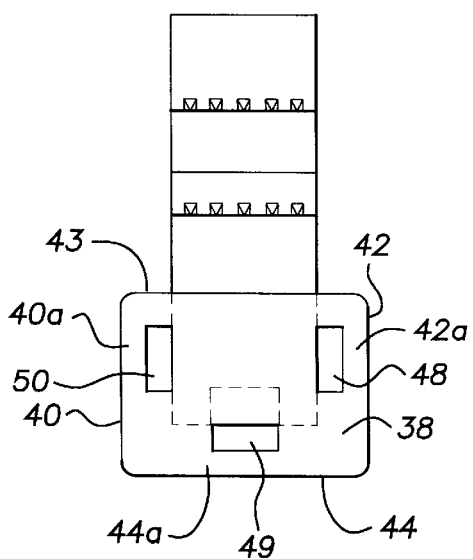
FIG. 3 is a top plan view of the clip as viewed in FIG. 2.
Figure 4:
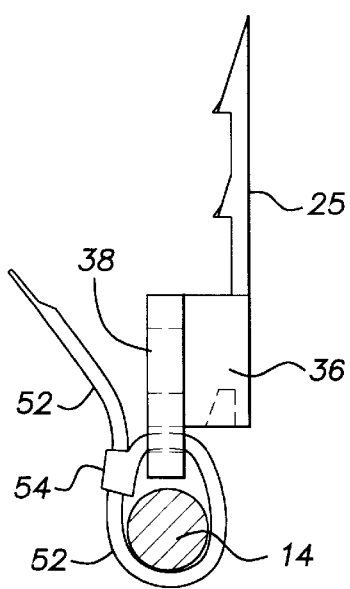
FIG. 4 is a right side view of the clip as shown in FIG. 3.

As shown in FIGS. 2–4 the clip 10 for securing cable runs preferably comprises an elongated strip-like plastic structure 24, having a flat back 25 extending the length of the structure, which consists of a top portion 26, or anchor portion, and a bottom portion 28, the top portion 26 being dimensioned to be slid endwise underneath the bottom edge 22 of a siding board to insert the top portion 26 under the overlapping portion 20a of siding board to wedge the clip, in a conventional manner, between the overlapping and overlapped boards. The top portion 26 of the clip has an intermediate thickness 30 to facilitate the movement under the overlapping portion 20a with the clip having a ramp 32 at the top end of the clip which ramps from the rear side of the clip to above the intermediate thickness 30. The top portion 26 of the clip also has an intermediate ramp 34 which ramps up from the intermediate thickness 30 between the ramp 32 and the bottom portion 28. The top of the ramps have a tooth like structure 33 to bite into the back side of the overlapped siding when the clip is pulled in a downward direction.

The bottom portion 28 of the clip has a thickness which provides a base 36 for an integral rectangular tie portion 38 having opposing vertical side edges 40, 42 and horizontal top and bottom edges 43, 44 with portions 40a, 42a, 44a along the side edges 40, 42 and the bottom edge 44 extending outwardly of the length and width of the base to overhang the base and provide clearance for access to tie openings or slots 48, 49, 50 through the edge portions. In the preferred embodiment, the slots 48, 49, 50 are such that flat plastic tie strips 52 may be threaded through the slots and around a cable, or cables to be secured to the clip. Preferably each tie strip 52 is an integral plastic strip having a "self locking" buckle at one end through which the strip can be threaded to tighten and lock the strip around the cable, or cables, and tie such to the clip. Such self locking tie strips are conventional and commercially available. Referring to the drawings, FIG. 4 illustrates the use a plastic tie strip 52 having a self locking "buckle" 54 at one end. In FIG. 4 the tie strip has been threaded through the slot opening 49 and around the cable 14 and through the "buckle", but for purposes of illustration, has been shown as not yet pulled to full tightness around the cable.

It will be understood that while plastic tie strips with a self locking "buckle" is preferred, other ties may be used and the slot openings made as necessary to accommodate the ties to be used. Thus as an illustrative example various types of twist ties or wire ties may be employed. Moreover, while a molded plastic clip is preferred, the clips may be made up of pieces or otherwise constructed to embody the features of the invention.

What I claim is:

1. A clip for connecting a generally vertical and/or generally horizontal run of a communication cable on a wall having overlapping siding thereon extending in a generally horizontal direction, said clip comprising an anchor portion at one end dimensioned to slide under an overlapped board of the overlapping siding to mount said clip on the wall, and a base extending axially outwardly from said anchor portion, said base providing a support for a tie portion having vertical and horizontal edge portions extending laterally outwardly from different sides of said base, said vertical and horizontal edge portions having cable tie openings for receiving ties for making tie connections to generally horizontal and vertical cable runs adjacent the respective horizontal and vertical edge portions.

2. The clip of claim 1 wherein said edge portions containing said cable tie openings comprise overhangs from respective sides of said base.

3. The clip of claim 1 wherein there are two of said vertical edge portions extending laterally beyond opposite sides of said base and one said horizontal edge portion extending laterally beyond another side of said base.

4. The clip of claim 3 wherein said base is dimensioned to maintain said tie openings in said edge portions in spaced relation from the overlapping siding to facilitate running of cable ties through said tie openings.

5. A clip for connecting a generally vertical and/or generally horizontal run of a communication cable on a wall having overlapping siding thereon extending in a generally horizontal direction, said clip being elongated and comprising a top portion, a bottom portion, and a rear surface for said portions, said top portion comprising an anchor portion dimensioned to slide under an overlapped board of the overlapping siding to mount said clip on the wall, said bottom portion comprising a tie support structure extending forwardly from said rear surface below said anchoring portion, and a tie portion having a vertical edge portion and a horizontal edge portion extending laterally outwardly from different sides of said tie support structure, said vertical edge portion having a cable tie opening for making a tie connection to a generally vertical axis cable run adjacent said vertical edge portion and said horizontal edge portion having a cable tie opening for making a tie connection to a generally horizontal axis cable run adjacent said horizontal edge portion.

6. A clip for connecting a generally vertical and/or generally horizontal run of a communication cable on a wall having overlapping siding thereon extending in a generally horizontal direction, said clip being elongated and comprising a top portion, a bottom portion, and a rear surface for said portions, said top portion comprising an anchor portion dimensioned to slide under an overlapped board of the overlapping siding to mount said clip on the wall, said bottom portion comprising a tie support structure extending forwardly from said rear surface below said anchoring portion, and a tie portion having vertical and horizontal edge portions extending laterally from different sides of said tie support structure, at least one of said edge portions having a cable tie opening for making a tie connection to a generally vertical axis cable run adjacent the respective edge portion and at least one of said edge portions having a cable tie opening for making a tie connection to a generally horizontal axis cable run adjacent the respective edge portion, said edge portions having cable tie openings for making tie connections comprising overhangs from said support structure.

* * * * *